A. DE DION & G. BOUTON.
CONNECTING ROD COUPLING.
APPLICATION FILED OCT. 6, 1909.
1,037,211.
Patented Sept. 3, 1912.
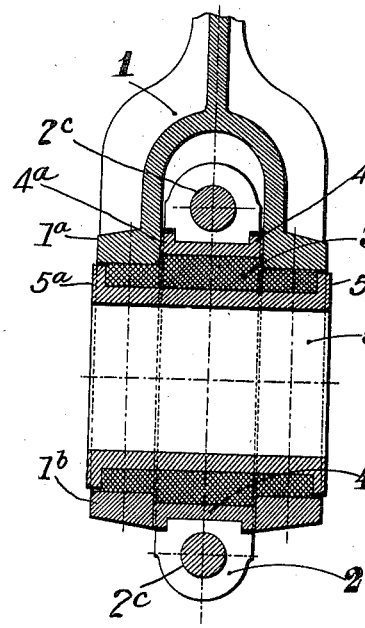
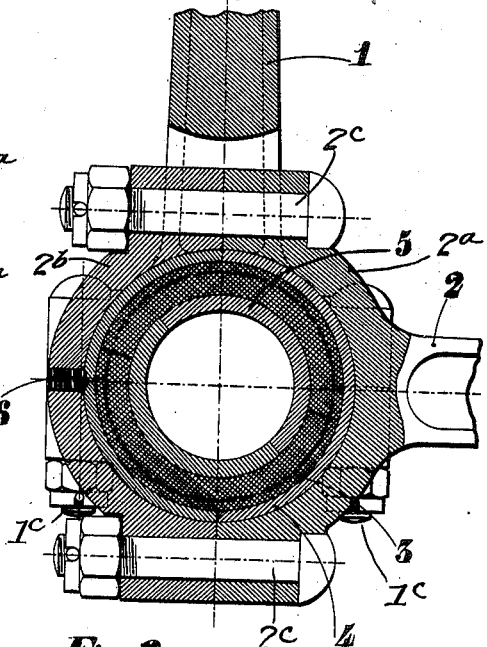
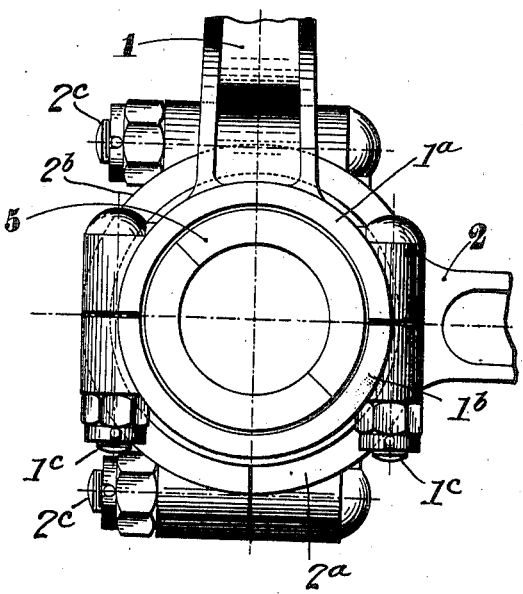
Witnesses:
Inventors:
Albert de Dion,
Georges Bouton.

United States Patent Office.

ALBERT DE DION AND GEORGES BOUTON, OF PUTEAUX, FRANCE.

CONNECTING-ROD COUPLING.

1,037,211.   Specification of Letters Patent.   Patented Sept. 3, 1912.

Application filed October 6, 1909. Serial No. 521,323.

*To all whom it may concern:*

Be it known that we, ALBERT DE DION and GEORGES BOUTON, citizens of the French Republic, residing at Puteaux, Department of the Seine, in France, have invented certain new and useful Improvements in Connecting-Rod Couplings; and we do hereby declare the following to be a full, clear, and exact description of the invention, such as will enable others skilled in the art to which it appertains to make and use the same.

This invention aims to provide an improved form of coupling between the heads of connecting rods, which is especially applicable to motors comprising a number of cylinders arranged in V-fashion.

The novel features of the invention will appear from the following description and claims.

In the accompanying drawing: Figure 1 is a longitudinal section of a coupling constructed in accordance with the invention. Fig. 2 is a section at right angles to that of Fig. 1, and Fig. 3 is a side elevation of the device.

Referring to the drawing, 1 indicates one of the connecting rods and 2 the other connecting rod. The head of the connecting rod 1 is formed of two sections 1$^a$, 1$^b$, which are connected with each other by means of bolts 1$^c$. Said head is made in the form of a fork, and in said fork a ring 3 is clamped, by tightening the bolts 1$^c$. For convenience in assembling, the ring 3 is split longitudinally, as shown in Fig. 2, and within said ring a split sleeve 5 is positioned, which is provided with end flanges 5$^a$ abutting against the edges of the ring and holding the same in place. The two flanges 5$^a$ of the split sleeve likewise serve to center said sleeve on the crank pin, which extends through the same.

The head of the second connecting rod 2 is centered on the ring 3, which forms a bearing for it, the head of the rod 2 being formed of two sections 2$^a$, 2$^b$, which are connected together around the ring 3 by means of bolts 2$^c$, one of said bolts fitting in the crotch of the forked part of the rod 1, as shown. Clamped between the sections 2$^a$, 2$^b$ is a sleeve 4, that is held against angular displacement in the head by means of a screw 6. At the edges of the sleeve 4, the same is provided with annular flanges 4$^a$ which abut against the inner surface of the aforesaid fork in order to prevent lateral play of the rod 2 with respect to the rod 1. The bearing of the rod 2 on the ring 3 is of small extent, but this presents no inconvenience because these two parts only rock relatively to each other. It will be understood that in addition to the fact that the axes of the two rods meet on the axis of the crank pin, the construction is of great simplicity and strength, and the coupling can be easily assembled and taken apart. Moreover, the crank pin is acted upon through a single journal, and the longitudinal volume of the whole does not exceed that of an ordinary connecting rod head, which presents the advantage of reducing the journals of the crank, and consequently its total length, to the minimum.

Without limiting ourselves to the precise construction shown, we claim:—

1. The combination with a longitudinally-split sleeve and a split ring embracing the same, of a connecting rod having a forked, transversely-split head, between the sections of which said ring is clamped, a sleeve surrounding said ring and bearing at its edges against the inner faces of the forked head, and a second connecting rod having a split head embracing and bearing on said last named sleeve.

2. The combination of a longitudinally-split sleeve, a split ring embracing the same, a connecting rod having a forked transversely-split head, oppositely-located bolts which clamp the sections of said head on said ring, a sleeve surrounding said ring and having lateral flanges bearing against the inner faces of the forked head, a second connecting rod having a transversely-split head embracing and bearing on said last named sleeve, and oppositely-located bolts securing together the sections of said last named head, one of said bolts being located in the crotch of the forked head, as described.

In testimony whereof we affix our signatures, in presence of two witnesses.

ALBERT DE DION.
GEORGES BOUTON.

Witnesses:
  LOUIS JOAN,
  H. C. COXE.